July 22, 1958      D. D. FRIEL      2,844,066
METHOD OF PHOTOMETRIC ANALYSIS
Filed Aug. 17, 1951      2 Sheets-Sheet 1
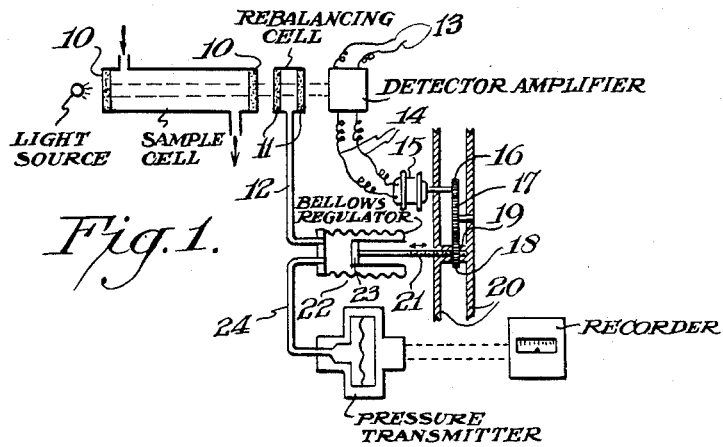
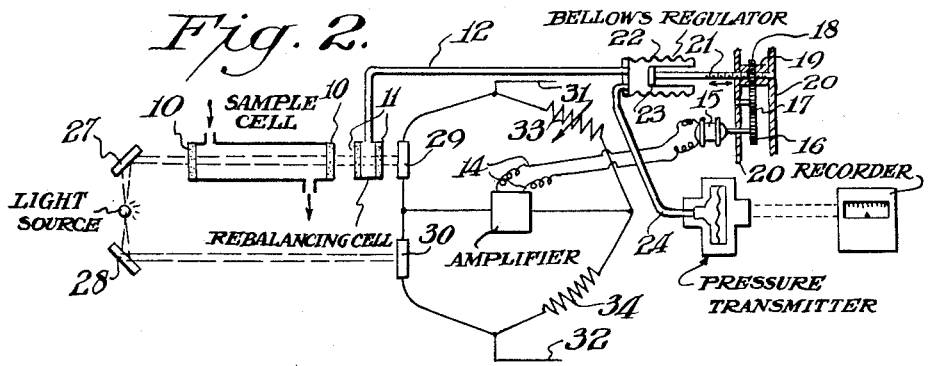
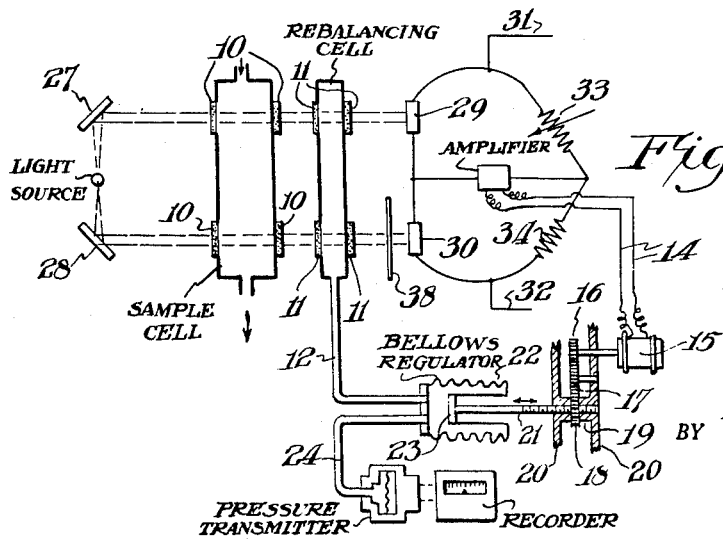
INVENTOR:
Daniel D. Friel
BY Harry J. McCauley
ATTORNEY.

July 22, 1958  D. D. FRIEL  2,844,066
METHOD OF PHOTOMETRIC ANALYSIS
Filed Aug. 17, 1951  2 Sheets-Sheet 2
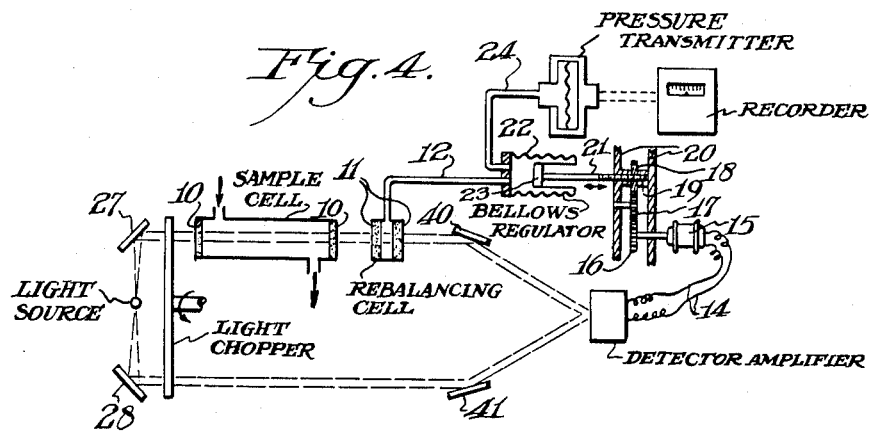
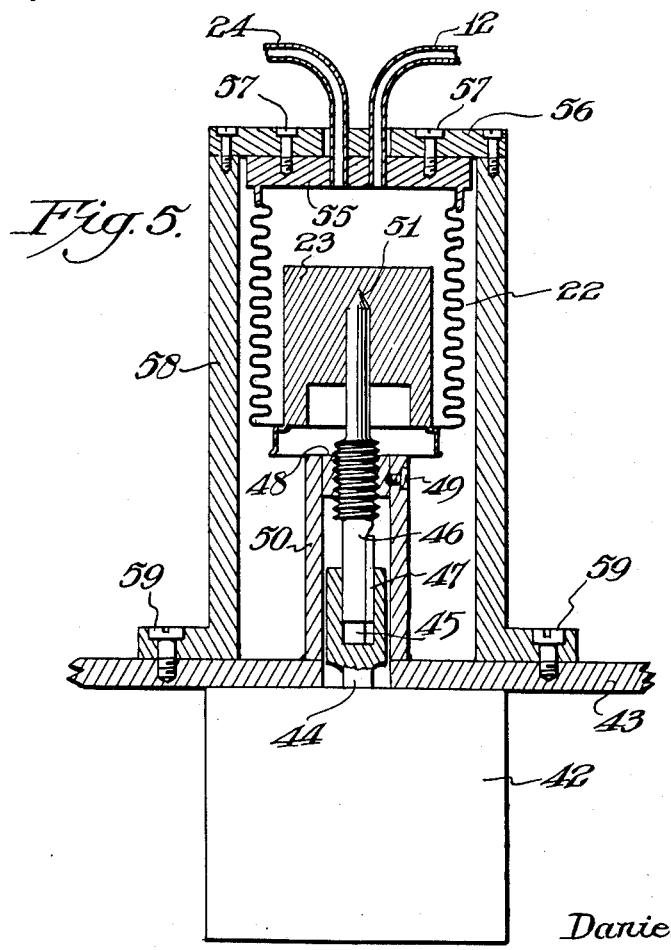
INVENTOR:
Daniel D. Friel
BY Harry J. McCauley
ATTORNEY.

United States Patent Office 2,844,066
Patented July 22, 1958

2,844,066
METHOD OF PHOTOMETRIC ANALYSIS

Daniel D. Friel, Wilmington, Del., assignor to E. I. du Pont de Nemours & Company, Wilmington, Del., a corporation of Delaware Application August 17, 1951, Serial No. 242,347

6 Claims. (Cl. 88—14)

This invention relates to photometric analysis and, more particularly, to a method for the optical rebalancing of null-type photometric analytical equipment wherein a substantially constant number of molecules of the substance under analysis is maintained in the illumination path or paths.

As is well understood in the art, photometric analysis comprises the measurement of the absorption of light in traversing a sample of material which it is desired to analyze. The relationship involved is expressed mathematically by Beer's law in the following equation:

$$\text{Fraction absorbed} = \frac{I_0 - I_1}{I_0} = 1 - e^{-kcx}$$

where:

$I_0$ is the intensity of incident radiation of a given wavelength, $I_1$ is the intensity of transmitted radiation of the given wavelength, $e$ is the base of the natural system of logarithms $=2.718\ldots$, $k$ is the absorption coefficient of the substance under analysis at the given wavelength, $c$ is the concentration of the substance, and $x$ is the thickness of the specimen in the path of the radiation.

Instrument manufacturers have, in recent years, come to favor null-balanced, servo-type instruments, because of the elimination of error common to all deflectional types of instruments caused by variations of the amplifier or instrument gain. Null-balanced instruments incorporate a servo system to create a signal or change equal and opposite to the change in the measured value, which thus restores the net input to the amplifier to zero, or to some other preselected datum condition. Null operation has the additional advantage that, with certain arrangements of apparatus, it is possible to reduce errors arising out of variations in radiation source intensity.

A very effective type of null balancing comprises optical rebalancing, by which is meant regulation of the light influx to the detector system to attain a fixed datum condition, which may be constant intensity of illumination, constant illumination ratio, constant illumination difference, or some other preselected state, depending upon the optical arrangement and the electrical circuitry of the apparatus employed. It has hitherto been the practice to regulate the light incident upon the detectors by calibrated mechanical light gates of a wide variety of designs and types such as those described in U. S. Patent 2,694,335; however, light gates possess inherent disadvantages in that it is difficult to obtain gates having a linear calibration and, even if a particular gate is calibrated accurately, the calibration is dependent on the characteristics of the source, detectors and other apparatus elements. This is disadvantageous because, if it develops that one of the apparatus elements wears out or even changes its characteristics in the course of time, absorption determinations will be in error unless the light gate is re-calibrated to compensate for the new conditions. Often the changes in the characteristics of the elements occur slowly and over relatively long periods of time, so that the operator does not have clear warning that remedial measures are necessary until a decided deviation becomes evident, which is undesirable from the standpoint of continuous process control. Light gates, of necessity, mask different areas of the light source's emitting surface and the detector's light-sensitive surface at each particular setting, which results in disproportionate effects arising out of local emissivity or sensitivity differences in these surfaces. Another disadvantage of mechanical light gates is that the calibration of these devices is dependent on the characteristics of the specific substance being analyzed for, making recalibration necessary whenever it is necessary to change from the determination of one component to the determination of a different component.

A principal object of this invention is to provide a method for rebalancing photometric analyzers wherein the calibration is substantially independent of the spectral region within which the light source operates and also of the spectral sensitivity of the detectors.

An equally important object of this invention is to provide a method for rebalancing photometric analyzers having the same calibration for all materials being analyzed.

Another object of this invention is to provide a method for rebalancing photometric analyzers having a very high sensitivity.

Another object of this invention is to provide a method for rebalancing photometric analyzers having a substantially linear calibration.

Other objects of this invention will become apparent from the detailed description and the following drawings, in which:

Fig. 1 is a diagrammatic representation of a conventional single-beam photometric gas analysis apparatus provided with an additional cell for rebalancing according to this invention, Fig. 2 is a diagrammatic representation of a conventional double-beam photometric gas analysis apparatus provided with an additional cell for rebalancing according to this invention, Fig. 3 is a diagrammatic representation of a second type of conventional double-beam photometric gas analysis apparatus provided with an additional cell for rebalancing according to this invention, Fig. 4 is a diagrammatic representation of a conventional double-beam, single detector type photometric gas analysis apparatus provided with an additional cell for rebalancing according to this invention, and Fig. 5 is a vertical sectional view of a preferred design of bellows regulator adapted to use as a rebalancing mechanism in the practice of this invention.

Generally, optical rebalancing according to this invention comprises interposing a second mass of the component analyzed for in the light path in series with the sample under analysis, whereby the light is made to pass through both in sequence in its transit to the detector, and varying the number of molecules in said second mass so that a substantially constant preselected total number of molecules of the component under analysis will always be positioned across the light beam (or beams) when the intensity of the light impinging on the detector (or detectors) attains the preselected datum condition. The extent to which sample material must be added to or removed from the second mass in the light beam to attain the datum light condition provides a convenient linear index of the amount of the substance present in the sample under analysis.

Photometric analysis is most commonly employed in the investigation of materials in the gaseous phase, therefore, this invention will be described in greatest detail in its application to gas analysis. It will be understood, however, that optical rebalancing according to this invention is equally applicable to liquid phase systems, when devices hereinafter described are employed for the interposition in or removal of material from the light path in series with the sample cell. Furthermore, the term "photometric analysis" as herein used is intended to comprise the entire radiation spectrum, including X-rays, ultraviolet light, visible light and infrared light, and electrical microwaves, and also alpha, beta and neutron particle streams.

The apparatus arrangements of Figs. 1 through 4, in which the same reference numerals identify common parts of the apparatus, illustrate the application of this invention to both single and double beam photometric analysis, utilizing either one or two detector elements, these arrangements being the types most commonly employed, which detector elements are referred to collectively in the claims, together with their auxiliaries, as "light-measuring means." In all cases the sample to be analyzed is flowed continuously through a sample cell provided with light-transparent windows 10 for passage of the analyzing radiation therethrough; however, it will be understood that this invention is also adapted to the analysis of static samples. For simplicity of representation, the apparatus shown is intended for the analysis of only one sample ingredient; however, this invention is equally applicable to the simultaneous analysis of a number of separate ingredients, as will be hereinafter described in greater detail.

In each of Figs. 1 through 4 a rebalancing cell is interposed in the analyzing light in series with the sample cells, the rebalancing cells constituting gas-tight enclosures which are in communication with the bellows regulators through connecting tubes 12. The rebalancing cells are each provided with light-transparent windows 11, which are similar in all respects to windows 10, for the free transit of light therethrough. The light escaping from the rebalancing cells impinges on a detector element of a construction responsive to the particular light employed for the analysis, such as a bolometer, for infrared analysis, a phototube, for visible or ultraviolet analyses, or like devices. The light impinging upon the detector elements generates an electrical signal which, depending on its sign and magnitude, initiates the introduction of or withdrawal from the rebalancing cell of an increment of the ingredient under analysis of such amount that null balance is restored at the preselected datum condition with reference to which the apparatus operates.

The single-beam apparatus of Fig. 1 is provided with a detector which is shown diagrammatically as incorporating an associated amplifier, a fixed reference D. C. electrical bias being impressed on the detector through leads 13. The construction of this apparatus is such that it functions by null-balancing at a preselected absolute light intensity on the detector as datum condition over the full analytical range. Output leads 14 transmit the signal originated in the detector-amplifier to reversible motor 15 which, through pinion 16 and idler gear 17, turns drive nut 18. Drive nut 18 is restrained from movement out of the vertical plane including pinion 16 and idler 17 by restraining bushings 19 secured to the inside walls 20 of the gear casing. Threaded lead screw 21 engages with drive nut 18 and is advanced or retracted by the rotation of 18, so as to contract or expand the bellows 22 of the bellows-regulator, respectively, by bearing against the end closure 23 thereof. Preferably, the bellows element 22 is spring-biased so that, unless restrained, it normally takes a fully distended position. If desired, however, lead screw 21 may be fixedly attached to closure 23 by a universal connection or the like, so that movement of screw 21 both positively contracts and expands the regulator.

Bellows 22 is filled with the pure component which it is desired to analyze, or with a mixture of this component and a diluent gas which does not absorb the analyzing light. As bellows 22 is contracted, more of the absorbing substance is forced into the rebalancing cell under the higher ambient pressure maintained in bellows 22 and tube 12. Under these conditions, more light is absorbed by the material within the rebalancing cell. When bellows 22 is expanded, the concentration of absorbing substance maintained in the rebalancing cell is decreased linearly and less light is absorbed by this material. Thus, if the control is such that a constant light intensity is maintained on the detector element, the concentration of absorbing substance maintained at any moment within the rebalancing cell is a function of the quantity of that substance existing in the gas stream passing through the sample cell. The reference electrical bias applied to the detector elements through leads 13 is chosen to buck out the detector signal corresponding to the detector response at zero ingredient composition or, if desired, at the lower value defining a somewhat more limited range if the existing process conditions permit. Thereafter, any deviation from this datum condition is reflected in a signal voltage which operates reversible motor 15 to increase or decrease the concentration of substance maintained in the rebalancing cell, thereby restoring the light level to constant refernce intensity. Measurement of the pressure applied to the rebalancing cell to achieve restoration of the datum light intensity affords a convenient index of the concentration of the ingredient under analysis present in the material passing through the sample cell. This pressure measurement is accomplished by connecting bellows 22 through tube 24 with a conventional diaphragm type pressure transmitter. The existing pressure is indicated by a conventional recorder, responsive to the pressure transmitter, the scale of which is preferably calibrated in terms of percent ingredient concentration in the sample stream to facilitate readings.

Fig. 2 shows a typical double-beam, double-detector arrangement in which a constant ratio of the illumination intensities of the two light beams is utilized as the datum condition.

In this arrangement two light beams are obtained from the common source by reflection from mirrors 27 and 28. Light reflected from mirror 27 traverses the sample cell and rebalancing cell in series and impinges on detector 29. A reference beam is reflected from mirror 28 through the air directly to detector 30. Detectors 29 and 30 are connected in opposition in a Wheatstone bridge circuit powered through leads 31 and 32, which are connected to an A. C. power source if the detectors are bolometers, or to a D. C. source where the detectors are phototubes or thermocouples. Variable resistor 33 and fixed resistor 34 are connected in circuit in the remaining legs, and an amplifier is connected across the conjoint points of the bridge to transmit an amplified deviation signal to reversible motor 15, which restores the light intensity impinging on detector 29 by optical rebalancing in a manner identical with that described for the apparatus of Fig. 1.

In Fig. 3, which details another arrangement utilizing a constant ratio of illumination intensities of the two light beams as the datum condition, the electrical circuit is identical with that shown in Fig. 2.

In this arrangement, both the sample and rebalancing cells are extended across both light beams, but the lowermost beam is provided with a light filter 38 while the top beam impinges directly on detector 29. If filter 38 is chosen so that it will absorb all radiation which would be absorbed selectively by the ingredient under analysis, but will transmit the remaining radiation, the lowermost light beam provides a reference which is independent of variation in ingredient concentration but which compensates automatically for uniform deposition of interfering foreign material on the windows of the cells. Optical rebalancing according to this invention with this electro-optical arrangement is accomplished in exactly the same manner as described in detail for Fig. 1.

The double beam photometric analysis arrangement of Fig. 4, in which reference is to a constant illumination difference as datum condition, employs reflectors 27 and 28, such as those of Fig. 2, but utilizes a single detector-amplifier which may be similar to that described for the apparatus of Fig. 1. Reflectors 40 and 41 direct both beams to the same area of the detector. In this case, light from one beam or the other is made to impinge alternately on the detector through the action of the rotating light chopper disk, which is provided with a coaxial arcuate slot (not shown) over 180 degrees of its expanse. An alternating current signal generated in response to the relative intensities of the beams in the upper and lower paths is passed by the detector-amplifier to reversible motor 15, which effects optical rebalancing by re-positioning the piston of the bellows regulator as heretofore described with respect to Fig. 1.

The apparatuses shown in Figs. 1–4 are each representative of types which operate with reference to one of the several preselected datum conditions. It will be understood that changes of the reference standard in the case of the instruments of Figs. 2–4 can be made by suitable modification of the electrical circuit in a manner well known to those skilled in the art and therefore not further discussed here.

The bellows-regulator detailed in Fig. 5 affords advantages of compactness and simplicity over that represented in Figs. 1 to 4, inclusive. In this assembly, the reversible motor is enclosed in housing 42 which is attached to a mounting plate 43 by screws or other means. The motor shaft 44 is provided with a central drilled passage 45 receiving the lower end of spindle 46, which is slidably keyed therein at 47 to permit longitudinal movement between the shaft and the spindle while preventing rotational displacement therebetween.

The central portion of spindle 46 is threaded to engage with nut 48 attached to bushing 50 by set screw 49. Bushing 50 is fixedly secured to mounting plate 43, so that the assembly comprising nut 48 and bushing 50 provides support and guidance for spindle 46 in its advance or retraction. The end 51 of spindle 46 remote from the motor is conically shaped to mate with a blind bore formed in end closure 23 of bellows 22, the convolutions of which are preferably fabricated from metal spring stock, so that the bellows normally tend to elongate and thus constantly bear against the spindle. The same effect can, of course, be obtained by utilizing the familiar conventional design of non-elastic bellows provided with an integral externally located biasing spring.

The lowerskirt of bellows 22 is hermetically sealed to the lower periphery of closure 23, while the upper skirt is similarly attached to stationary closure 55, secured to the housing plate 56 by bolts 57. Closure 55 is drilled to receive gas tubes 12 and 24, which connect the bellows regulator with a rebalancing cell and a pressure transmitter, respectively, as has already been described. The bellows-regulator housing is completed by flanged-end cylinder 58 fastened to mounting plate 43 with screws 59.

In operation, it is preferred to use a relatively small volume rebalancing cell of the order of $1/16''$ length in the direction of light travel, for the reason that operation over a comparatively high pressure range can be thereby had with compact apparatus. In a typical installation, the rebalancing cell was operated over an absolute pressure extending from about 0.1 atmosphere to about 1.0 atmosphere, however, there is no reason for restricting operation within these limits, depending on the special requirements of the analysis performed and the physical strengths of the individual apparatus elements.

For best sensitivity, where possible it is desirable to employ a relatively low concentration or amount of light-adsorbing substance in the rebalancing cell, down to an optimum value which depends on the particular analysis, instrument characteristics and other factors, due to the fact that the ratio of light absorbed per unit increase in gas concentration decreases with increasing concentration in accordance with the mathematical relationship expressed by Beer's law. Thus, where methane is analyzed for, an approximate four-fold improvement in sensitivity was obtained where a 5% $CH_4$—95% inert gas ($N_2$) composition was used in rebalancing over that for a 25% $CH_4$—75% $N_2$ composition. At the same time, optical rebalancing according to this method possesses sufficient sensitivity, even with concentrations of light-absorptive substance of 25% or higher in the rebalancing cell, to permit its wide use, especially in view of the other important advantages it displays. Test experience has also revealed that optical rebalance according to this invention is obtained in a small time interval without serious "hunting," which is particularly advantageous where appreciable and frequent fluctuations in composition occur in the sample stream under analysis.

It will be understood that the foregoing description has been concerned with the analysis of a single component only; however, this invention can be readily applied to multi-component anlysis as well by providing an independent sample cell-rebalancing cell-bellows regulator-pressure transmitter-recorder system for each component and circulating the sample stream through each sample cell in turn. If desired, the concentration of all components may be conveniently read on a single conventional multi-point recorder responsive to each of the independent systems.

Another arrangement of equipment adapted to multi-component analysis is similar to that disclosed in U. S. Patent 2,431,019 which employs a multiplicity of detectors in series, each selectively responsive to the light absorption occasioned by an individual component. In this case a separate rebalancing cell is provided for each of the separate components, each cell being mounted in front of its associated detector. With this apparatus it is possible to employ a single light source for the analysis of several components and the equipment space required is somewhat less than where independent systems are used for individual analyses.

Thus far this description has been concerned with gas analysis solely, and the bellows regulators heretofore described are intended exclusively for gas service. Optical rebalancing is, however, equally applicable to liquid analyses.

In the case of liquids, which are incompressible, the regulation of the quantity of material interposed in the analyzing light path necessary to restore the light on the detector to the datum condition may be achieved with variable volume rebalancing cells, or by the somewhat less practicable expedient of appropriately adjusting the concentration of the liquid material placed in the light path. The principle of operation, however, is exactly the same as that applied in the analysis of gases according to this invention, namely, interposing a second mass of the component analyzed for in the light path in series with the sample under analysis, and varying the number of molecules in said second mass so that a substantially constant preselected total number of molecules of the component analyzed for will always be positioned across the light beam when the light impinging on the detector attains the preselected datum conditions. In fact, this invention may be utilized for gas analysis by the use of a light-traversed, constant pressure, variable volume cell similar in all respects to that used for liquids, however, variable pressure operation is preferred for gases because the size of the apparatus is thereby reduced greatly, and the need for moving parts in the light paths is obviated.

A cell suitable for liquid phase analysis service is described in U. S. Patent 2,436,511, it being understood that in use the reversible motor responsive to the analytical light beam detector regulates the clearance between the movable optical window and the fixed optical window to control correspondingly the amount of liquid component placed in series with the sample analyzed. With this arrangement, the rebalancing system operates at near-constant pressure and indication of the amount of material interposed in the light beam is based on the instantaneous position of the bellows, as distinguished from the pressure variation already described for gas analysis. A number of conventional devices are available for signaling changes in bellows position, such as a helical potentiometer, the setting of which is mechanically altered in accordance with the position taken by the movable element of the rebalancing cell, or the like.

Although it is preferred to analyze materials in the gas and liquid phases, respectively, by the use of rebalancing elements incorporating the same phases as the ingredients under analysis, it is possible to employ gas phase or liquid phase materials for rebalancing without regard to the physical state of the sample. There is some broadening of the light absorption lines accompanying transit from material of one phase to material of another, which results in some objectionable non-linearity of calibration, but this does not prevent successful operation.

From the foregoing, it will be evident that this invention is capable of considerable modification in the practice and fields in which used without departing from its essential spirit, wherefor it is intended to be limited only by the scope of the following claims.

What is claimed is:

1. In the analysis of fluid materials to determine the percentage content of a preselected component in said fluid materials on the basis of the selective absorption of light by said component in the course of the transmission of a beam of light directed through a light-transmitting sample cell containing a representative sample of said materials and thereafter to light-measuring means, wherein a preselected established value of light transmitted through a given mass of the component analyzed for is chosen as the datum condition of transmitted light, the method of obtaining a quantitative measure of the amount of said component analyzed for in said sample comprising interposing optically in series with said sample cell ahead of said light-measuring means a light-transmitting rebalancing cell containing therein a quantity of said component analyzed for, adjusting said quantity of said component analyzed for contained in said rebalancing cell to thereby attain said datum condition of transmitted light as detected by said light-measuring means, and obtaining an indication of said amount of said component analyzed for in said sample as a function of said quantity of said component analyzed for contained in said rebalancing cell when said datum condition of transmitted light is reached.

2. The analysis of fluid materials to determine the percentage content of a preselected component in said fluid materials according to claim 1 wherein said datum condition of transmitted light is a predetermined absolute intensity of the light transmitted through said sample cell and through said rebalancing cell.

3. The analysis of fluid materials to determine the percentage content of a preselected component in said fluid materials according to claim 1 wherein said datum condition of transmitted light is a predetermined constant difference between said light transmitted through said sample cell and through said rebalancing cell and the light transmitted in a separate beam of light passed to said light-measuring means along a path having substantially constant light absorption during said analysis and clear of said sample cell and said rebalancing cell.

4. The analysis of fluid materials to determine the percentage content of a preselected component in said fluid materials according to claim 1 wherein said datum condition of transmitted light is a predetermined constant ratio of said light transmitted through said sample cell and through said rebalancing cell with respect to the light transmitted in a separate beam of light passed to said light-measuring means along a path having substantially constant light absorption during said analysis and clear of said sample cell and said rebalancing cell.

5. The analysis of fluid materials to determine the percentage content of a preselected component in said fluid materials according to claim 1 wherein said datum condition of transmitted light is a predetermined constant ratio of said light transmitted through said sample cell and through said rebalancing cell with respect to the light transmitted in a separate beam of light passed to said light-measuring means along a path including thicknesses of sample cell and rebalancing cell and their contents substantially identical with those interposed in said first-mentioned beam together with a light filter blocking passage of light by said separate beam of said light-measuring means in the wavelength range absorbed by said component analyzed for.

6. The analysis of fluid materials to determine the percentage content of a preselected component in said fluid materials according to claim 1 wherein said datum condition of transmitted light is a predetermined constant difference between said light transmitted through said sample cell and through said rebalancing cell and the light transmitted in a separate beam of light passed to said light-measuring means along a path including thicknesses of sample cell and rebalancing cell and their contents substantially identical with those interposed in said first-mentioned beam together with a light filter blocking passage of light by said separate beam to said light-measuring means in the wavelength range absorbed by said component analyzed for.

References Cited in the file of this patent

UNITED STATES PATENTS

| Re. 23,023 | Wolf et al. | Aug. 3, 1948 |
|---|---|---|
| 2,019,871 | Pettingill et al. | Nov. 5, 1935 |
| 2,050,608 | Hellige | Aug. 11, 1936 |
| 2,545,162 | Muly et al. | Mar. 13, 1951 |
| 2,721,942 | Friel et al. | Oct. 25, 1955 |

FOREIGN PATENTS

| 285,848 | Great Britain | June 28, 1928 |

UNITED STATES PATENT OFFICE
CERTIFICATE OF CORRECTION

Patent No. 2,844,066                                 July 22, 1958

Daniel D. Friel

It is hereby certified that error appears in the printed specification of the above numbered patent requiring correction and that the said Letters Patent should read as corrected below.

Column 4, line 29, for "refernce" read --reference--; column 5, line 56, for "lowerskirt" read --lower skirt--; column 6, line 3, for "adsorbing" read --absorbing--; line 27, for "anlysis" read --analysis--; column 8, line 32, for "beam of" read --beam to--.

Signed and sealed this 7th day of October 1958.

(SEAL)
Attest:

KARL H. AXLINE                                 ROBERT C. WATSON

Attesting Officer                              Commissioner of Patents